Patented Aug. 26, 1924.

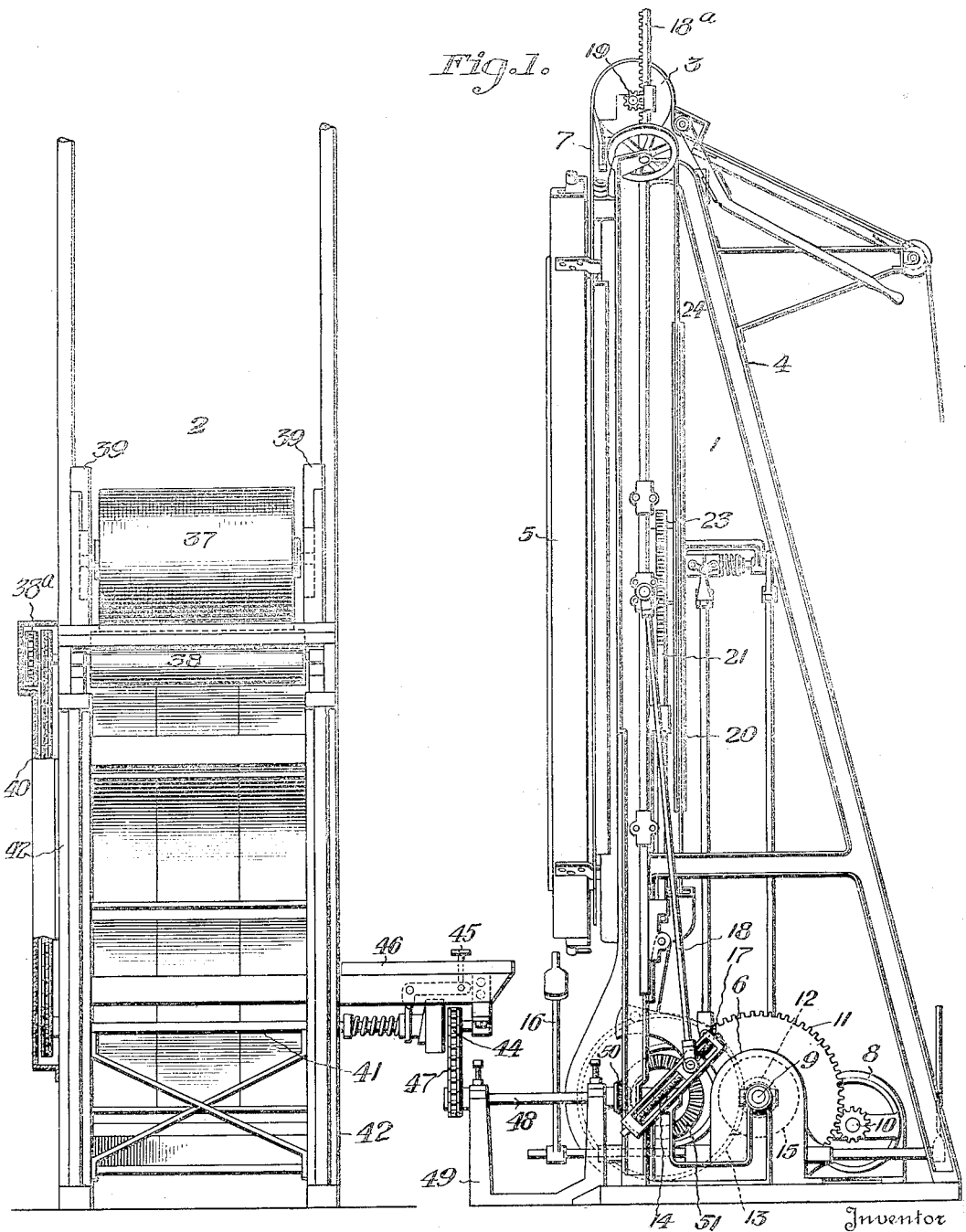

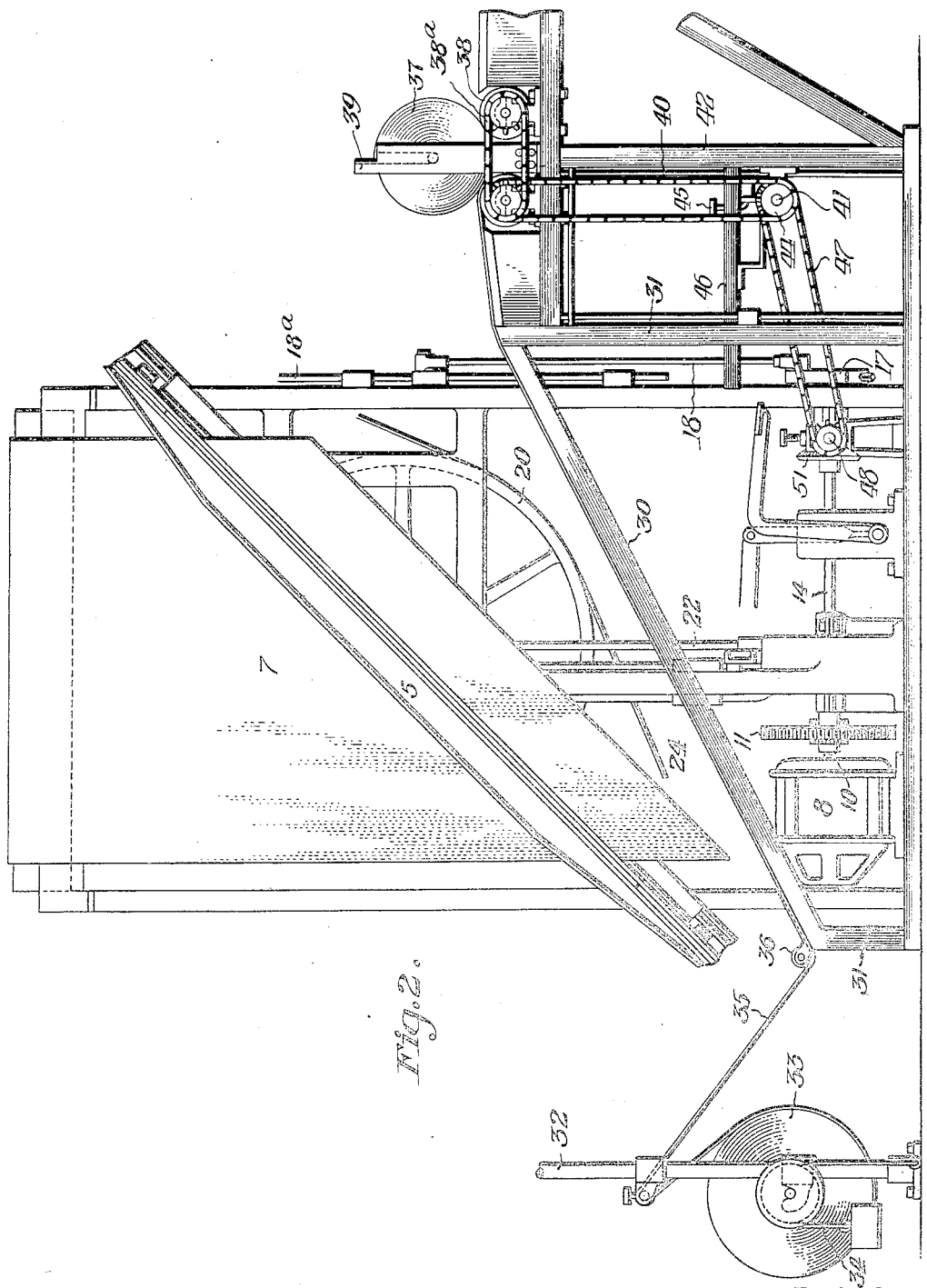

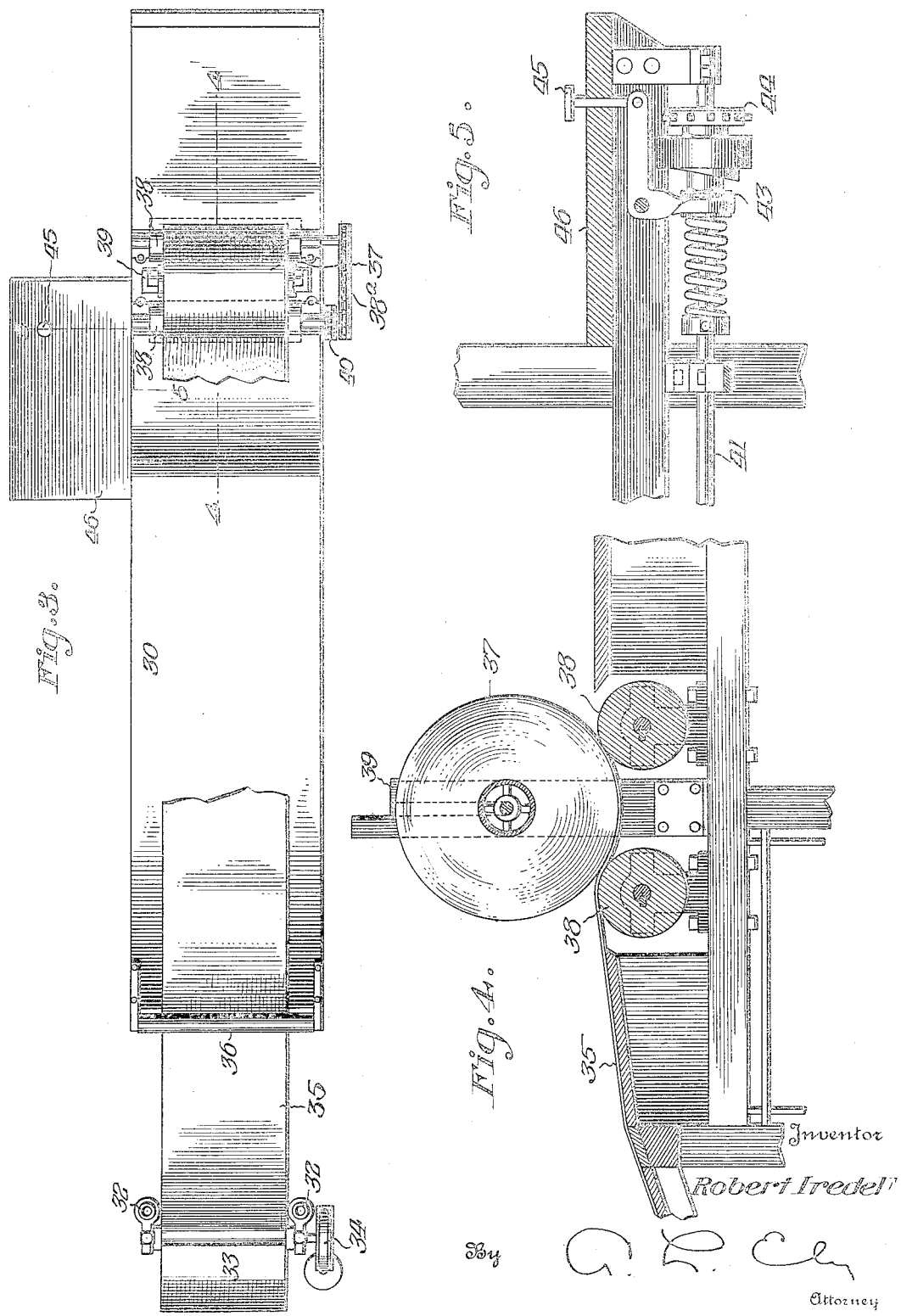

1,506,428

UNITED STATES PATENT OFFICE.

ROBERT IREDELL, OF AKRON, OHIO, ASSIGNOR TO THE GENERAL TIRE AND RUBBER COMPANY, OF AKRON, OHIO, A CORPORATION OF OHIO.

BIAS-CUTTING MACHINE.

Application filed August 25, 1922. Serial No. 584,178.

*To all whom it may concern:*

Be it known that I, ROBERT IREDELL, a citizen of the United States, residing at Akron, in the county of Summit, State of Ohio, have invented certain new and useful Improvements in Bias-Cutting Machines, of which the following is a specification.

My invention relates to attachments for machines adapted for cutting fabric on the bias.

A machine of the class with which my invention is particularly concerned is disclosed in Patent No. 942,164. This specific type of fabric cutting machine is known commercially as a vertical bias cutter and it operates to cut diagonally across a sheet of fabric to sever strips therefrom, in which the warp and weft threads are at an angle, or on the bias, relative to the long edge of the strip. Bias cutting machines are used in the tire making industry both for cutting woven fabric and so called " cord fabric." Cord fabric comprises spaced cords, running lengthwise of the sheet, and held together by light, easily broken tie threads, and is usually impregnated with rubber. Because of its construction, i. e. lack of substantial weft threads, cord fabric is easily distorted and the cords thrown permanently out of alignment when it is cut in relatively narrow strips such as are used in building tires. This distortion frequently occurs in handling the strips, as, for instance, when they are being carried away from the "bias cutter" by the operators and in storing them for future use. Such distortion destroys the alignment of the edges of the strip and also of the cords and renders such strips unfit for use in building tires.

It is the particular purpose of the present invention to provide a practical form of apparatus that is adapted for attachment to bias cutting machines of the above noted type and for reeling up the strips of fabric as fast as they are severed by the machine.

It is also the purpose of my invention to provide an apparatus for reeling up the strips as they are severed by the cutter, and at the same time interposing a liner between the strips to prevent their subsequent adhesion.

Other objects of my invention are to provide an apparatus in the form of an attachment that is adapted to reel up the strips in end to end position and to convey the strips away from the proximity of the cutter.

With these, and other objects in view, as will presently appear, the invention resides in the combination of elements and arrangement of parts presently described in their preferred assembly and particularly pointed out in the claims appended hereto.

In the drawings accompanying and forming a part of this specification:

Figure 1 is an elevational view illustrating the application of my invention to the form of bias cutting machine previously noted, the machine being shown conventionally in side elevation;

Figure 2 is a front elevational view of a bias cutting machine and my novel attachment positioned relative thereto;

Figure 3 is a top plan view of a part of the apparatus comprising my attachment;

Figure 4 is an enlarged sectional view taken on the line 4—4 of Figure 3; and

Figure 5 is an enlarged sectional view taken on the line 5—5 of Figure 3.

Referring to the drawings, the numeral 1 designates, generally, the bias cutting machine, and 2, my novel attachment therefor.

The bias cutting machine 1 is illustrated conventionally, and details thereof which are not essential to a general understanding of its operation and its relation to my novel attachment have been omitted from the drawings. Briefly described, this type of machine comprises a fabric supporting and feeding roll 3 that is journaled for intermittent rotation about a horizontal axis upon the frame 4 of the machine, an inclined clamping member 5 for holding the end of the fabric while it is cut by a reciprocating knife (not shown) and a driving unit 6. The roll 3 is adapted to intermittently feed the loose end of a sheet of fabric, designated 7, in a pendant vertical position past the clamp 5 which is then in raised position. Upon operation of the machine the clamp fixes the end of the fabric and the knife is caused to move beneath it, whereby strips of the fabric are successively cut from the sheet. The clamp 5 is mounted upon the frame 4 of the machine to span the pendant end of the sheet of fabric 7 at substantially a 45° angle relative thereto, although the angle may be varied. The driving unit 6 comprises a motor 8, adapted to drive a shaft 9 through the medium of meshed gears 10 and 11. The shaft 9 carries a toothed pinion 12 in mesh with a gear wheel 13 fast upon a main drive shaft 14. The pinion 12 is adapted to be clutched or released from the shaft 9 by a clutch element 15 that ordinarily is operated by means of a hand lever, not shown. In this instance and in order to facilitate the operation of the machine when my attachment is used therewith, I have mounted a foot lever 16 upon the operating shaft of the clutch element 15. The advantage of this arrangement will presently appear. The shaft 14 is adapted to rotate intermittently, the feed roll 3 by means of a crank 17 and pitman 18 which reciprocate a vertical rack 18$^a$. The rack 18$^a$ meshes with a pinion 19 upon the roll 3 as shown in Figure 1. The shaft 14 also serves to oscillate a cable drum 20 by means of a second rack 21, pitman 22 and pinion 23, the latter being fixed to the drum. The drum 20 carries a cable 24 which reciprocates the cutter across the fabric beneath the clamp 5. As this type of cutter is well known in the art, it is believed that the operation of the bias cutting machine has been described fully for the purposes of the application.

This type of bias cutter, known as a vertical bias cutter, has within a few years found considerable acceptance on the part of tire manufacturers because of its speed and cheapness of operation as compared with other cutters, but considerable difficulty has been encountered in arranging some practical form of apparatus for removing the strips from the machine. There is here shown a form of apparatus which is adapted to be attached to this type of bias cutter and which is operated by and in conjunction with the cutter to receive and package the strips of bias material as fast as they can be cut by the machine. Furthermore, the apparatus shown will assemble the cut strips of fabric without wrinkling or distortion of the fabric. It is especially suitable for use in cutting cord fabric previously referred to.

In front of and preferably parallel to the frame of the bias cutter is arranged an inclined table or platform 30 supported on uprights 31 and spaced so that the platform is long enough to receive one of the strips cut from the fabric roll without wrinkles. At the lower end of the platform is located an upright 32 in which is carried a roll of liner fabric 33, the rotation of which is retarded by a brake band 34. From the roll 33 the liner 35 is conducted beneath a guide roller 36, runs along the table and passes to a wind-up roll 37.

As the bias cutter is operated, the ends of the piece cut off are seized by operators and the cut strip laid upon the liner, which is being passed over the table by driving mechanism to be described. It will be noted that the platform is preferably inclined at approximately the angle at which the fabric is cut so that operators may easily lay the cut strips down upon the liner. It will also be noted that the liner 35 moves in a path parallel with the surface of the fabric so that the strips of cut fabric are arranged end to end in the wind-up roll 37.

The wind-up roll is supported or cradled on two rolls 38 and is guided in vertical uprights 39 so that it adjusts itself both as to speed and size as the roll increases. The rolls 38 are connected together by a sprocket chain 38$^a$ and one of them is driven by a chain 40 from a jack-shaft 41 located in the frame 42 which supports the wind-up roll. The shaft 41 is adapted to be driven through clutch mechanism 43, by a sprocket 44. The clutch mechanism is designed to be disconnected, if desired, by a foot pedal 45 located in a platform 46 upon which one of the operators may stand.

The sprocket 44 is driven by chain 47 from a shaft 48 mounted in bearings 49 at the base of the machine, the inner end of the shaft carrying a bevel pinion 50 which meshes with the bevel gear 51 on the main drive shaft 14. In this manner the feed of the liner strip is in timed relation to the operation of the cutter so that enough fabric is fed forward to space the ends of the strips in the desired manner.

The operation will be understood from the description which has been given, it being necessary to state here only that the cut fabric is laid upon the liner strip and wound in the roll 37 without wrinkling or distortion. The machine shown is a simple and easily operated solution of the problem of transporting the cut fabric away from the vertical bias cutter.

It is obvious that the details of construction as shown and described are not essential and may be varied within the scope of the invention as set forth in the claims appended hereto. The strip of liner 35 constitutes a conveyor for removing the bias strips of fabric without bending or folding.

What I claim is:

1. In a machine of the character set forth, the combination with a cutter and means for feeding fabric to the cutter in substantially a vertical plane, of a conveyor to receive the cut strips of fabric, said conveyor running in a path parallel to said plane.

2. In a machine of the character set forth, the combination with a cutter and means for feeding fabric to the cutter in substantially a vertical plane, of a conveyor for receiving the cut strips of fabric, said conveyor running in a path parallel to said plane, and means for moving the conveyor in timed relation to the operation of the cutter.

3. In a machine of the character set forth, the combination of a vertical bias cutter adapted to cut fabric at an acute angle, a conveyor to receive the fabric therefrom, and means to guide the conveyor in a path approximating the direction of cut.

4. In a machine of the character set forth, the combination of a vertical bias cutter adapted to cut fabric at an acute angle, a conveyor to receive the fabric therefrom, means to guide the conveyor in a path approximating the direction of cut, and means to propel the conveyor in timed relation to the operation of the cutter.

5. In a machine of the character set forth, the combination of a vertical bias cutter, a support arranged in front of the cutter, a liner, and means for drawing the liner over the support and rolling it up with the pieces of bias cut fabric.

6. In a machine of the character set forth, the combination of a vertical bias cutter, a support for a liner arranged in front of the cutter, a liner passing over the support parallel to the face of the fabric, and means for rolling the liner and cut pieces of fabric together.

7. In a machine of the character set forth, the combination of a vertical bias cutter, a support for a liner arranged in front of the cutter, a liner passing over the support parallel to the face of the fabric, means for rolling the liner and cut pieces of fabric together, and mechanism for driving said means in timed relation to the operation of the bias cutter.

8. In an apparatus for packaging strips of bias fabric, the combination of a cutter operating upon the fabric while in vertical position, a liner and a liner support, and means for conducting the liner past the cutter in a path parallel to the surface of the fabric and for rolling the liner with the bias strips.

ROBERT IREDELL.